March 7, 1961    M. FLUGSTAD    2,974,257
PROTECTIVE APPARATUS FOR POWER SYSTEMS
Filed April 13, 1959    4 Sheets-Sheet 1

INVENTOR.
MORRIS FLUGSTAD
BY
ATTORNEY

March 7, 1961 M. FLUGSTAD 2,974,257
PROTECTIVE APPARATUS FOR POWER SYSTEMS
Filed April 13, 1959 4 Sheets-Sheet 2

INVENTOR.
MORRIS FLUGSTAD
BY
ATTORNEY

March 7, 1961 M. FLUGSTAD 2,974,257
PROTECTIVE APPARATUS FOR POWER SYSTEMS
Filed April 13, 1959 4 Sheets-Sheet 3

INVENTOR.
MORRIS FLUGSTAD
BY
ATTORNEY

INVENTOR.
MORRIS FLUGSTAD
BY
ATTORNEY

2,974,257

PROTECTIVE APPARATUS FOR POWER SYSTEMS

Morris Flugstad, Seattle, Wash., assignor to Boeing Airplane Company, Seattle, Wash., a corporation of Delaware Filed Apr. 13, 1959, Ser. No. 806,066

7 Claims. (Cl. 317—29)

This invention relates to a fault protection system for a power generating and distribution network, and more particularly to the case where such distribution network is fed from parallel connected generators.

In many instances, it is necessary to connect several generators to the same distribution system, as this arrangement gives the best operating economy. One such parallel connected system comprises a plurality of generators each of which supplies power to its respective feeder network through a generator breaker which functions to disconnect its generator from its respective feeder network. The respective feeder networks are each connected to a paralleling bus network by their respective generator bus tie breakers which in turn function to disconnect the respective feeder networks from the paralleling bus network. In operation, if a fault occurs either in one of the parallel operated generators or on its output conductors, which for purposes of description will be referred to as zone one, its associated generator breaker must be actuated to the circuit open position, to thus disconnect the particular generator from the rest of the system and thereby prevent damage to the equipment while still maintaining continuity of service to the various loads. On the other hand, if a fault occurs on this generator's feeder bus network or on that portion of the paralleling bus network between the generator bus tie breaker and the associated section of the differential current transformers, which for purposes of description is referred to as zone two, both its particular generator bus tie breaker and its generator breaker must be actuated to the circuit open position in order to maintain proper operating conditions.

Heretofore, the above mentioned zones were protected against fault conditions by either a separate set of differential current transformers for each zone or one zone was protected by a set of differential transformers and the other zone was protected by means of fuses. Thus, neither of these prior art fault protection systems is entirely satisfactory. The first requires an excessive amount of equipment, and the second is not satisfactory from a maintenance and continuity of service standpoint. This is particularly true in aircraft applications where size, weight and continuity of service are extremely important factors.

In accordance with this invention, the fault protection of the two zones of the distribution system is accomplished in a simplified manner. As will be explained more fully hereinafter, a first signal is obtained, specifically by one side of a single set of differential current transformers, which is proportional to the particular generator's armature current that is flowing on the generator side of its generator breaker or disconnecting means, and a second signal is obtained, specifically by the other side of the single set of differential current transformers, which is proportional to the vector sum of the current flowing in the paralleling bus network and the current flowing to the load connected to the particular generator's feeder bus network. A single sensing circuit is connected to be responsive to the difference in magnitude in the first and second signal to thus effect a control signal. Relaying means is connected to be responsive to the control signal so that when a fault occurs in either zone one or zone two, the particular generator is deenergized and its generator breaker is actuated to the circuit open position. Other relaying means also responsive to the control signal is provided for effecting, a period of time after the generator breaker's actuation, an actuation of the generator bus tie breaker or disconnecting means to the circuit open position only when a fault occurs on the second zone. In other words, circuit means is provided so as to wait a period of time after the generator breaker is actuated to the circuit open position and then if the fault is in zone one the control signal is not of sufficient magnitude to effect an actuation of the generator bus tie breaker to the circuit open position, however, if the fault is in zone two the control signal is of sufficient magnitude to effect an actuation of the generator bus tie breaker to the circuit open position.

Therefore, a broad object of this invention is to provide for selectively disconnecting from the remainder of a parallel connected system either a faulty energy source and output conductors, or in addition to the energy source and output conductors, a faulty feeder bus associated therewith.

Another object of this invention is to provide for protecting two zones of a parallel connected generating and distribution system by means of a single set of differential current transformers.

A further object of this invention is to provide for protecting two zones of a parallel connected generating and distribution system with a minimum of equipment.

Other objects of this invention will become apparent from the following description when taken in conjunction with the accompanying drawings in which.

Figure 1:
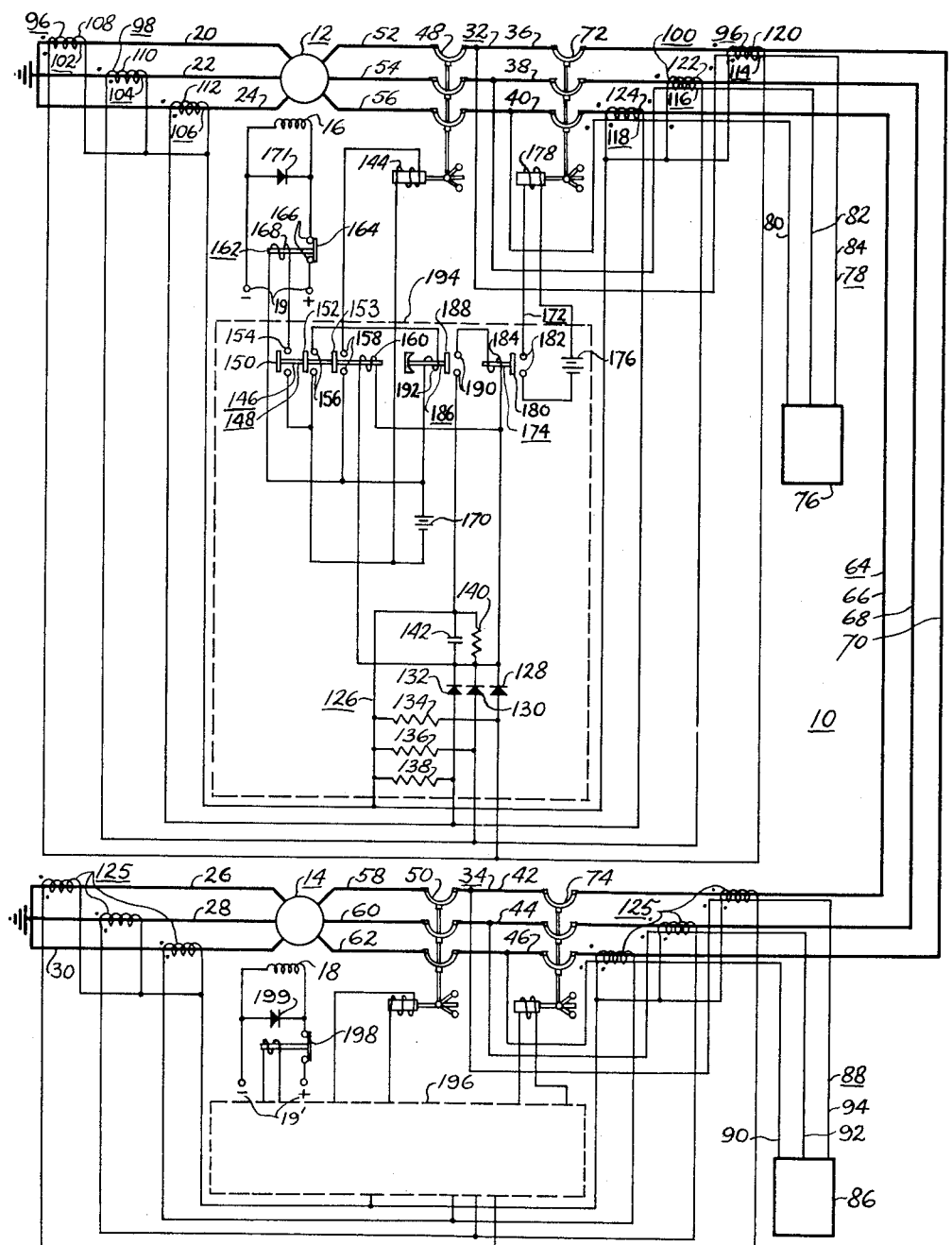
Fig. 1 is a schematic diagram of circuits and apparatus illustrating one embodiment of the teachings of this invention in which a time delay relay is provided for effecting the hereinbefore mentioned waiting period that exists prior to when the generator bus tie breaker may be actuated to the circuit open position.

Referring to Fig. 1, there is illustrated a multiple-generator power generating and distribution system 10 illustrating one embodiment of the teachings of this invention. As shown, the system 10 includes a plurality of energy sources, specifically three-phase alternating-current generators 12 and 14 which are connected to be operated in parallel. The generators 12 and 14 include direct-current field windings 16 and 18, respectively, which receive direct current from terminals 19 and 19', respectively, and neutral armature conductors 20, 22 and 24, and neutral conductors 26, 28 and 30, respectively. Separate three-phase feeder bus networks 32 and 34 are provided for the respective generators 12 and 14. As illustrated, the feeder bus network 32 comprises conductors 36, 38 and 40, while the feeder bus network 34 comprises conductors 42, 44 and 46.

Separate generator breakers or disconnecting means 48 and 50 are arranged for connecting the feeder bus networks 32 and 34 to their respective generators 12 and 14 through generator output conductors 52, 54 and 56, and generator output conductors 58, 60 and 62, respectively. On the other hand, in order to connect the respective generator feeder bus networks 32 and 34 to a paralleling bus network 64, having conductors 66, 68 and 70, generator bus tie breakers or disconnecting means 72 and 74 are disposed as shown in Fig. 1.

A separate load 76 is connected to the feeder bus network 32 by means of a three-phase load circuit 78 including conductors 80, 82 and 84. In like manner, a separate load 86 is connected to the feeder bus network 34 by means of a three-phase load circuit 88 including conductors 90, 92 and 94. In operation, the generators 12 and 14 supply power to their respective loads 76 and 86. However, as can be seen from Fig. 1, the circuit connections are such that the generator 12 can, under certain operating conditions, also supply power to the load 86. In like manner, under certain operating conditions the generator 14 can also supply power to the load 76.

In order to obtain a first signal proportional to the armature current of the generator 12 that flows on the generator side of the generator breaker 48, and in order to obtain a second signal proportional to the vector sum of the current flowing in the load circuit 78 and the current flowing in the paralleling bus network 64, three-phase differential current transformer means 96 comprising two sections 98 and 100 is provided. In operation, the section 98 of the differential current transformer means 96 obtains the first signal proportional to the armature current of the generator 12 flowing on the generator side of the generator breaker 48. On the other hand, the section 100, of the differential current transformer means 96, obtains the second signal proportional to the vector sum of the current flowing in the load circuit 78 and the current flowing in the paralleling bus network 64. As can be seen from Fig. 1, the section 98 includes three current transformers 102, 104 and 106 having secondary windings 108, 110 and 112, respectively, which are disposed in inductive relationship with their respective neutral armature conductors 20, 22 and 24, the latter functioning as primary windings for the transformers 102, 104 and 206. The section 100, of the differential current transformer means 96 likewise includes three current transformers 114, 116 and 118 having secondary windings 120, 122 and 124 which are disposed in inductive relationship with the paralleling conductor 70 and the load conductor 84, the paralleling conductor 68 and the load conductor 82, and with the paralleling conductor 66 and the load conductor 80, respectively, the conductors 66, 68, 70, 80, 82 and 84 functioning as primary windings for the transformers 114, 116 and 118. Thus, the current transformers 102 and 114 comprise one pair of differential current transfomers for one phase of the system, the current transformers 104 and 116 comprising another pair of differential current transformers for the second phase of the system, and the current transformers 106 and 118 comprising a further pair of differential current transformers for the third phase of the system. The dots associated with the current transformers 102, 104 and 106 indicate that when current is flowing to the right in the conductors 20, 22 and 24, as shown, current is flowing down from the dots associated with the secondary windings 108, 110 and 112, as shown. On the other hand, the dots associated with the current transformers 114, 116 and 118 indicate that when current is flowing toward the right through the paralleling conductors 70, 68 and 66, as shown, current will flow down from the dots associated with the secondary windings 120, 122 and 124, as shown. Likewise, when current flows toward the right through the load conductors 84, 82 and 80, as shown, current will also flow down from the dots associated with the secondary windings 120, 122 and 124, as shown.

Current transformer means 125, identical to and similarly disposed to the differential current transformer means 96 is also provided for the generator 14 and its associated feeder bus network 34.

In order to obtain a control signal proportional to the difference in magnitude of the first three-phase output current or signal from the section 98, of the differential current transformer means 96, and the second three-phase output current or signal from the section 100, of the differential current transformer means 96, a three-phase sensing circuit 126 is provided and interconnected with the differential current transformer means 96, as shown in Fig. 1. The sensing circuit 126 is conventional and comprises a plurality of rectifiers 128, 130 and 132 and a plurality of resistors 134, 136 and 138 which are so interconnected and arranged as to effect across an output resistor 140 a direct-current voltage which is proportional to the difference in magnitude of the first and the second signals received from the sections 98 and 100, of the current transformer means 96. Filtering of the output voltage across the resistor 140 is provided by a capacitor 142.

For the purpose of effecting a deenergization of the field winding 16 of the generator 12, and an actuation of the generator breaker 48, having a tripping coil 144, to the circuit open position, when a fault occurs either in the generator 12 or between the generator 12 and its generator breaker 48 or between the generator breaker 48 and the section 100, of the differential current transformer means 96, relaying means 146 is connected to be responsive to the control signal appearing across the output resistor 140, of the sensing circuit 126. In this instance, the relaying means 146 comprises a relay 148 having movable contacts 150, 152 and 153, which are disposed to be actuated into the circuit closed position with respect to their stationary contacts 154, 156 and 158 when the operating coil 160, of the relay 148, is energized; a latching type field winding relay 162 having a movable contact 164, associated stationary contacts 166 and an operating coil 168 disposed to effect an actuation of the movable contact 164 to the circuit open position with respect to the stationary contacts 166 when the operating coil 168 is momentarily energized, so as to latch the relay 162 in the open position; and a source of energy, specifically a battery 170, connected to energize the tripping coil 144, of the generator breaker 48, and the operating coil 168, of the field winding relay 162, when the control signal appearing across the output resistor 140, of the sensing device 126, effects an energization of the operating coil 160, of the relay 148, so as to effect an actuation of the relay 148 to the circuit closed position. In order to provide a current discharge path for the stored energy that remains in the field winding 16 after the field winding relay 162 has been actuated to the circuit open position, a rectifier 171 is connected in shunt circuit relationship with the field winding 16.

A relaying circuit 172, including a relay 174 and a source of energy, specifically a battery 176, is provided for effecting an energization of the tripping coil 178, of the generator bus tie breaker 72, to thus effect an actuation of the breaker 72 to the circuit open position. As illustrated, the relay 174 includes a movable contact 180, associated stationary contacts 182 and an operating coil 184 disposed to effect an actuation of the movable contact 180 into the circuit closed position with respect to the stationary contacts 182 only when the control signal or voltage appearing across the output resistor 140 is of at least a predetermined magnitude and only when an energizing circuit has been completed to the operating coil 184.

For the purpose of rendering the operating coil 184, of the relay 174, responsive to the control signal appearing across the output resistor 140, a predetermined period of time after the generator breaker 48 is actuated to the circuit open position, to thus effect an actuation of the generator bus tie breaker 72 to the circuit open position only when a fault occurs between the generator breaker 48 and the section 100, of the differential current transformer means 96, a time delay relay 186 is provided and interconnected with the remainder of the circuit as shown in Fig. 1. Specifically, the time delay relay 186 includes a movable contact 188, associated stationary contacts 190, and an operating coil 192 connected to be energized from the source 170 when the relay 148 is in the circuit closed position. The time delay relay 186 is a timed closed relay and its movable contact 188 is actuated to the circuit closed position a predetermined period of time after its operating coil 192 is energized.

The portion of the control apparatus shown within the box 194 is duplicated in the box 196, both control apparatus operating in the same manner. The field winding relay 198 is also identical to the field winding relay 162 and cooperates with the control apparatus within the box 196 in the same manner that the relay 162 cooperates with the control apparatus within the box 194. The control apparatus within the box 196 also cooperates with the generator breaker 50 and with the generator bus tie breaker 74 in the same manner that the control apparatus within the box 194 cooperates with the generator breaker 48 and with the generator bus tie breaker 72. A rectifier 199, corresponding to the rectifier 171, is connected in parallel with the field winding 18.

The operation of the apparatus and circuits shown in Fig. 1 will now be described with reference to Figs. 1 and 2. Assuming that no fault exists on the system 10 and assuming that the generator 12 is supplying all of the power to the load 76 and that all of the power from the generator 12 flows through the load circuit 78, then all of the output current flows from the generator 12 through the output conductors 52, 54 and 56, the feeder bus network 32, and the load circuit 78, to the load 76. Under such a condition, the current flow through the load conductors 80, 82 and 84 effects output currents from the secondary windings 124, 122 and 120, which just balance the output currents from the secondary windings 112, 110 and 108 due to the current flow through the neutral armature conductors 24, 22 and 20, respectively. Thus, no output control signal appears across the load resistor 140, of the sensing device 126, and therefore neither the generator breaker 48 nor the generator bus tie breaker 72 is actuated to the circuit open position.

Still assuming that no fault exists on the system 10 and assuming that the generator 14 is supplying some of the power to the load 76, then current flows from the paralleling bus network 64 through a portion of the feeder bus network 32, and the load circuit 78, to the load 76. However, since this latter current flows through one set of the primary windings of the current transformers 114, 116 and 118 in one direction and then in the other direction through the other set of the primary windings of the current transformers 114, 116 and 118, no signal output is produced at the output of these current transformers 114, 116 and 118 due to such current flow from the generator 14 to the load 76. However, the current flow from the generator 12 through the load circuit 78 to the load 76 does effect a three-phase output signal from the section 100, of the differential current transformer means 96, which just balances the three-phase output signal from the section 98, as hereinbefore explained.

If current from the generator 12 flows both to the load 76 and to the load 86, the combined current flow through the primary windings of the current transformers 114, 116 and 118 would effect a three-phase output signal from the section 100, of the differential current transformer means 96, that would again just offset the three-phase output signal appearing at the output of the section 98, of the current transformer means 96. Thus, when no fault exists on the system 10, a control signal does not appear across the output resistor 140, of the sensing device 126.

If a fault occurs either in the generator 12 or on either of the output conductors 52, 54 and 56, or between the conductors 52, 54 and 56, or any combination thereof, then the field winding 16, of the generator 12, is deenergized and the generator breaker 48 is actuated to the circuit open position. Specifically, if a fault occurs on the output conductor 56, then output current from the generator 12 flows into the fault on the conductor 56 and a lesser amount or no current flows from the generator 12 through the load conductor 80 to the load 76. Such being the case, an unbalanced condition exists between the differential current transformers 106 and 118, to thus effect an output signal across the output resistor 140, of the sensing device 126. An output signal across the output resistor 140 effects a current flow through the operating coil 160, of the relay 148, to thus effect an actuation of the relay 148 to the circuit closed position. With the relay 148 in the circuit closed position, an energizing circuit is established from the battery 170 to the operating coil 168, of the field winding relay 162, which extends from the positive terminal of the battery 170 through the operating coil 168, the stationary contacts 154 and the movable contact 150, of the relay 148, to the negative terminal of the battery 170. An energization of the operating coil 168, of the field winding relay 162, effects an actuation of the relay 162 to the circuit open position, where it remains latched open, to thus deenergize the field winding 16, of the generator 12.

With the relay 148 in the circuit closed position, an energizing circuit is also established for the tripping coil 144, of the generator breaker 48, which extends from the positive terminal of the battery 170 through the stationary contacts 158 and the movable contact 153, of the relay 148, and the tripping coil 144, to the negative terminal of the battery 170. An energization of the tripping coil 144 effects an actuation of the generator breaker 48 to the circuit open position, where it remains latched open, thus disconnecting the generator 12 and its output conductors 52, 54 and 56 from the remainder of the system 10.

When the relay 148 is actuated to the circuit closed position an energizing circuit is also established for the operating coil 192, of the time delay relay 186, which extends from the positive terminal of the battery 170 through the operating coil 192, and the stationary contacts 156 and the movable contact 152, of the relay 148, to the negative terminal of the battery 170, to thus initiate a timing operation of the time delay relay 186.

Figure 2:
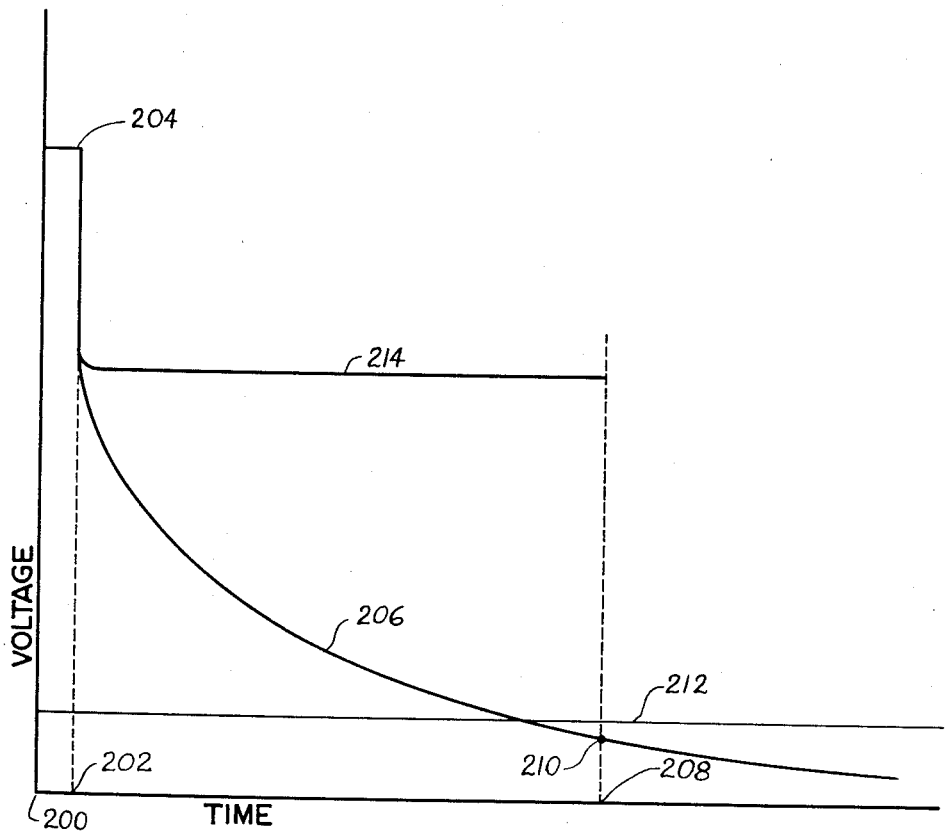
Fig. 2 is a graph illustrating the operation of the apparatus and circuits shown in Fig. 1 when a fault occurs in either zone one or zone two.

Referring to Fig. 2, it is assumed that the fault occurred on the output conductor 56 at a time as represented at 200 and that the generator breaker 48 was actuated to the circuit open position at a time as represented at 202. The voltage appearing across the output resistor 140, of the sensing device 126, between time 200 and 202, is represented at 204, since the fault on the output conductor 56 is being fed from both the generators 12 and 14. Actually the voltage as represented at 204 is proportional to the total current flowing into the fault on the conductor 56. Thus, when the generator breaker 48 is actuated to the circuit open position at a time as represented at 202, the voltage across the output resistor 140 drops rapidly as indicated in Fig. 2 since the fault can no longer receive current from the generator 14, and then decays off, according to the characteristics of generator 12, as represented by a curve 206, since the field winding 16, of the generator 12, is now also deenergized.

The movable contact 188, of the time delay relay 186, is actuated to the circuit closed position with respect to its stationary contacts 190 at a time represented at 208. At the time represented at 208, the voltage across the output resistor 140, of the sensing device 126, has fallen off to a value as represented at 210. However, in order for the relay 174 to be actuated to the circuit closed position, its operating coil 184, ignoring the voltage drop across the movable contact 188 of the time delay relay 186, must have a voltage across it of a magnitude as represented by a line 212. Thus, at the time, as represented at 208, when the time delay relay 186 completes the energizing circuit to the operating coil 184, of the relay 174, the voltage across the output resistor 140, of the sensing device 126, is not of sufficient magnitude to effect an actuation of the relay 174 to the circuit closed position, and thus the generator bus tie breaker 72 is not actuated to the circuit open position. A curve similar to the curve 206 is obtained when the fault occurs either on one of the output conductors 52 and 54 or in the generator 12 or some combination thereof, and therefore when such a fault occurs the generator bus tie breaker 72 is likewise not actuated to the circuit open position. In other words, the fault current decay characteristic of the generator 12, after being deenergized, is a function of the nature of the fault in zone one. Thus, regardless of the nature of the fault in zone one, the line 212 must be disposed above the curve similar to the curve 206 at the time represented at 208.

If a fault occurs on the conductor 40, of the feeder bus network 32, then both the generator breaker 48 and the generator bus tie breaker 72 are actuated to the circuit open position. Specifically, when a fault occurs on the conductor 40, both the generators 12 and 14 feed the fault, and the differential current transformers 106 and 118 effect an output voltage across the output resistor 140, of the sensing device 126, as represented at 204 in Fig. 2. This value of voltage at 204 is proportional to the total current flowing into the fault on the conductor 40.

The output voltage appearing across the output resistor 140 effects an actuation of the relay 148 to the circuit closed position to thus deenergize the field winding 16, of the generator 12, and an actuation of the generator breaker 48 to the circuit open position as hereinbefore described. The closing of the relay 148 to the circuit closed position also completes an energizing circuit to the operating coil 192, of the time delay relay 186, to thus start the timing operation of the relay 186.

When the generator breaker 48 is actuated to the circuit open position, the voltage appearing across the output resistor 140, of the sensing device 126, decreases to a value as represented by a curve 214 since the generator 12 can no longer feed the fault on the conductor 40. Note that in this case the voltage across the output resistor 140 remains substantially constant until the time, as represented at 208, is reached when the time delay relay 186 is finally actuated to the circuit closed position. The reason for this is that with the generator breaker 48 in the circuit open position, it is only the flow of current from the generator 14 that effects the unbalancing between the differential current transformers 106 and 118 and this current from the generator 14 continues to flow to the fault on the conductor 40 until the generator bus tie breaker 72 is actuated to the circuit open position.

As can be seen from Fig. 2, the magnitude of the voltage appearing across the output resistor 140 at the time the time delay relay 186 is actuated to the circuit closed position, is of adequate value to effect an actuation of the relay 174 to the circuit closed position. Such being the case, energizing current flows from the positive terminal of the battery 176 through the tripping coil 178, of the generator bus tie breaker 72, and the stationary contacts 182 and the movable contact 180, of the relay 174, to the negative terminal of the battery 176. An energization of the tripping coil 178 effects an actuation of the generator bus tie breaker 72 to the circuit open position, where it is latched to open, to thus disconnect the feeder bus network 32 from the remainder of the system 10. Of course, it is to be understood that if a fault occurs between the generator bus tie breaker 72 and the section 100, of the differential current transformer means 96, or on any part of the feeder bus network 32, the apparatus and circuits will function the same as if the fault had occurred on the feeder conductor 40. Therefore, two zones associated with the generator 12 are being protected against fault conditions, namely zone one, which includes the generator 12 and the output conductors 52, 54 and 56, and zone two which lies between the generator breaker 48 and the section 100, of the differential current transformer means 96.

If a fault occurs either in the generator 14 or between the generator 14 and the right section, as shown, of the differential current transformer means 125, the apparatus and circuits associated with the generator 14 function in the same manner as described with reference to the apparatus and circuits associated with the generator 12.

Figure 3:
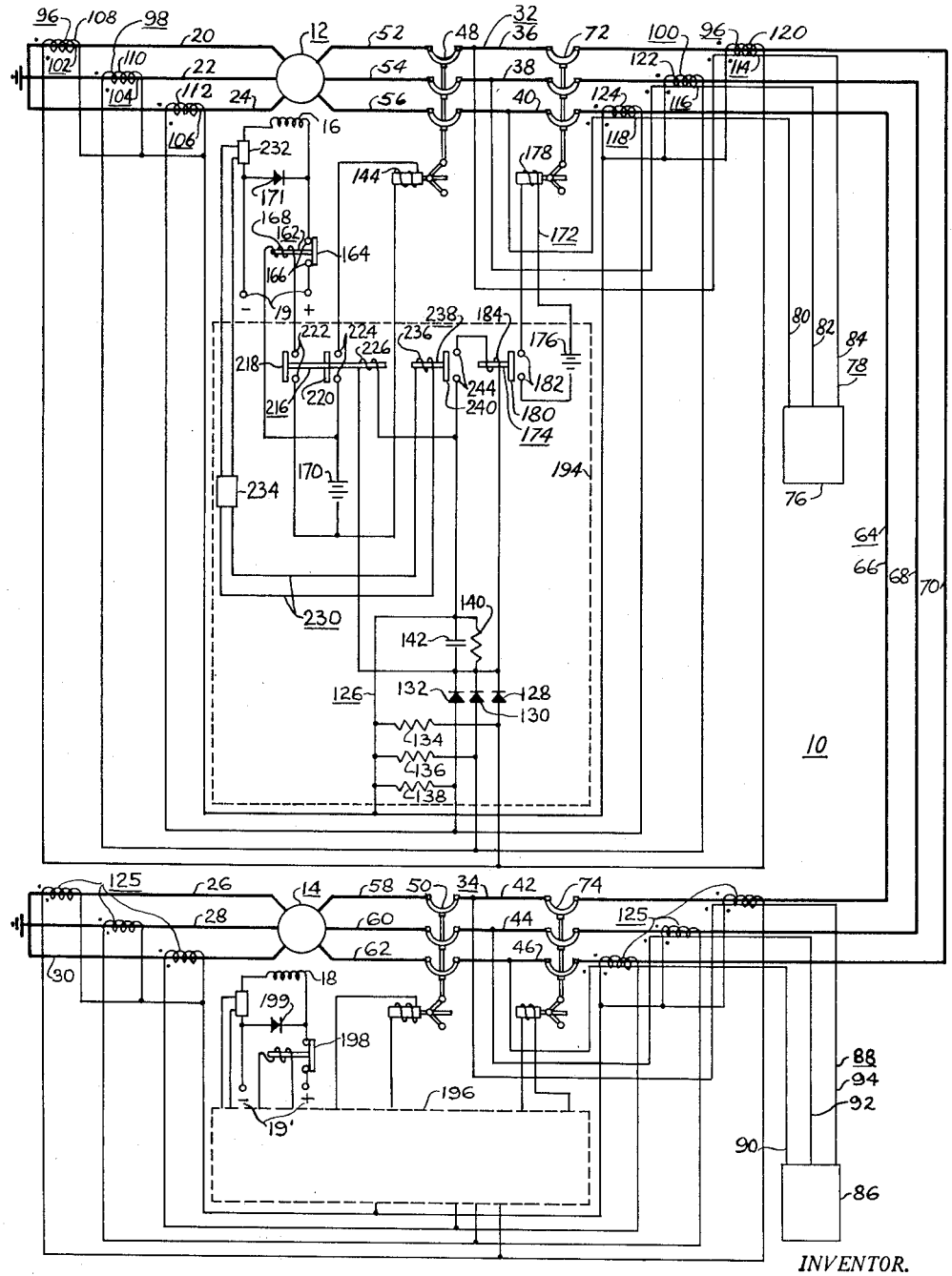
Fig. 3 is a schematic diagram of circuits and apparatus illustrating another embodiment of the teachings of this invention in which the hereinbefore mentioned waiting period is effected by rendering a relay responsive to a signal that is proportional to the generator field winding decay current that flows in a discharge circuit after the field winding is deenergized.

Referring to Fig. 3, there is illustrated another embodiment of the teachings of this invention in which like components of Figs. 1 and 3 have been given the same reference characters. The main distinction between the apparatus and circuits of Figs. 1 and 3 is that in the apparatus and circuits of Fig. 3, the timing function for when the energizing circuit is to be completed to the operating coil 184, of the relay 174, is obtained by control means other than the time delay relay 186, shown in Fig. 1. However, the relaying means for effecting a deenergization of the field winding 16, of the generator 12, and an actuation of the generator breaker 48 to the circuit open position is quite similar to that shown with respect to the apparatus of Fig. 1. This similar relaying means comprises a relay 216 which in turn includes movable contacts 218 and 220 which are disposed to be actuated into engagement with their stationary contacts 222 and 224 when an operating coil 226 is energized. As can be seen from Fig. 3, energizing circuits are completed to the tripping coil 144, of the generator breaker 48, and to the operating coil 168, of the field winding relay 162, when the relay 216 is in the circuit closed position.

Relaying means 230 is provided which is responsive to the current flow in the current discharge path of the field winding 16, of the generator 12, once the field winding relay 162 is actuated to the circuit open position. Specifically, a shunt 232 is connected in the current discharge path of the field winding 16 as shown in Fig. 3. The output voltage appearing across the shunt 232 is amplified by a direct-current amplifier 234 and the amplified voltage is applied to the operating coil 236 of a drop out relay 238, having a movable contact 240, which is actuated to the circuit closed position with respect to its stationary contacts 244 when the voltage applied to its operating coil 236 decreases to a predetermined value.

The operation of the apparatus and circuits in Fig. 3 will now be described. Assuming a fault occurs on the output conductor 56, then the field winding 16, of the generator 12, is deenergized and the generator breaker 48 is actuated to the circuit open position. In particular, when a fault occurs on the conductor 56, an unbalance occurs between the differential current transformers 106 and 118, to thus effect an output voltage across the output resistor 140, of the sensing device 126. This output voltage across the resistor 140 is represented at 246 in Fig. 4 and is proportional to the total current flowing into the fault on the conductor 56. The voltage appearing across the output resistor 140 effects an actuation of the relay 216 to the circuit closed position to thus effect an actuation of the field winding relay 162 to the circuit open position and an actuation of the generator breaker 48 to the circuit open position. When the generator breaker 48 is actuated to the circuit open position, at a time as represented at 248, the voltage appearing across the output resistor 140 decreases rapidly to a value as represented at 250 since the generator 14 can no longer feed the fault. Then the voltage across the output resistor 140 decreases, in accordance with the fault current decay characteristic of the generator 12 once it has been deenergized, as represented by a curve 252.

Figure 4:
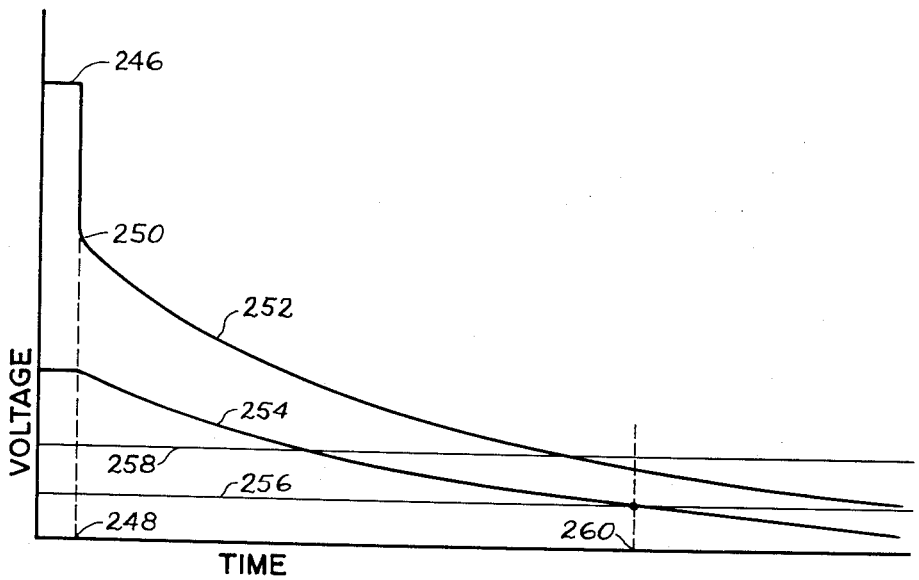
Fig. 4 is a graph illustrating the operation of the circuits and apparatus shown in Fig. 3 when a fault occurs in zone one.

The field winding relay 162 is actuated to the circuit open position at the same time as the generator breaker 48, and at this time as represented at 248, in Fig. 4, the voltage across the operating coil 236, of the relay 238, starts decreasing in a manner as represented by a curve 254. At a voltage value as represented by a line 256, the relay 238 drops out and completes the energizing circuit to the operating coil 184, of the relay 174. However, the voltage across the operating coil 184 must be of a value as represented by a line 258 in order to effect an actuation of the relay 174 to the circuit closed position. Note that in the case when the fault is on the conductor 56, or anywhere else in zone one, the voltage across the output resistor 140, of the sensing device 126, and thus the voltage across the operating coil 184, of the relay 174, at a time 260, when the relay 238 drops out, is not of sufficient value to actuate the relay 174 to the circuit closed position. Thus, under the assumed condition only the generator breaker 48 is actuated to the circuit open position to thus disconnect the generator 12 and its output conductors 52, 54 and 56 from the remainder of the system.

Curves similar to the curves 252 and 254 are obtained when a fault occurs in zone one other than on the output conductor 56, and therefore when such a fault occurs the generator bus tie breaker 72 is also not actuated to the circuit open position. The fault current decay characteristic of the generator 12 and the decay characteristic of the field winding 16 are a function of the nature of the fault in zone one. Thus, regardless of the nature of the fault in zone one, the settings of the relays 174 and 238 must be such that the line 258 is always above a curve similar to curve 252 at the time 260 when a curve similar to the curve 254 intersects the line 256.

Figure 5:
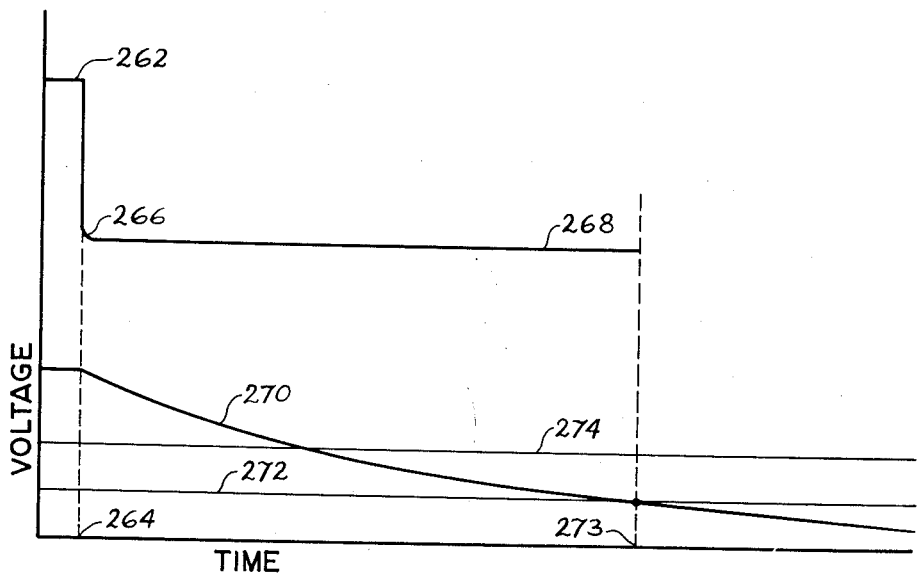
Fig. 5 is a graph illustrating the operation of the circuits and apparatus shown in Fig. 3 when a fault occurs in zone two.

Assuming a fault occurs on the conductor 40, of the apparatus of Fig. 3, then both the generator breaker 48 and the generator bus tie breaker 72 are actuated to the circuit open position. Specifically, under such a condition, there is an unbalance between the output currents from the differential current transformers 106 and 118, to thus effect a voltage across the output resistor 140, of the sensing device 126, as represented at 262 in Fig. 5. Under this condition, the field winding relay 162 and the generator breaker 48 are actuated to the circuit open position in the same manner as when a fault occurred on the output conductor 56. However, when the field winding relay 162 and generator breaker 48 are actuated to the circuit open position at a time as represented at 264, in Fig. 5, the voltage across the output resistor 140 decreases to a value as represented at 266 and then remains substantially constant as represented by a curve 268. Such being the case, when the voltage applied to the operating coil 236 of the relay 238 decreases in a manner represented by a curve 270 to a value as represented by a line 272, representing the drop out value for the relay 238, the output voltage across the output resistor 140, of the sensing device 126, at time 273, is of adequate value to effect an actuation of the relay 174 to the circuit closed position since the required magnitude of voltage to be across the operating coil 184 to effect an actuation of the relay 174 to the circuit closed position is as represented by a line 274. The actuation of the relay 174 to the circuit closed position completes an energizing circuit to the tripping coil 178, of the generator bus tie breaker 72, to thereby effect an actuation of the breaker 72 to the circuit open position, thus disconnecting the feeder bus network 32, of Fig. 3, from the remainder of the system. Since the remaining operation of the apparatus of Fig. 3 is similar to the operation of the apparatus and circuits of Fig. 1, a further description of such operation is deemed unnecessary.

It is to be understood that if in zone one fault protection is only desired between the generators 12 and 14 and their respective generator breakers 48 and 50, the section 98 of the differential current transformer means 96 could be associated with the output conductors 52, 54 and 56, and the left section, as shown, of the differential current transformer means 125, could be associated with the output conductors 58, 60 and 62, and the apparatus and circuits would function the same except that faults within the generators 12 and 14 will not be detected and the generators 12 and 14 will not be protected for such fault conditions within themselves.

The apparatus and circuits of the teachings of this invention have several advantages. For instance, only a single pair of differential current transformers is required to provide fault protection for each phase of two separate zones. Thus, the fault protection apparatus is simplified, thus minimizing the size and weight of the apparatus as well as the cost of the apparatus.

Since certain changes may be made in the above described apparatus and circuits and different embodiments of the invention may be made without departing from the spirit and scope thereof, it is intended that all matter contained in the above description or shown in the accompanying drawings shall be interpreted as illustrative and not in a limiting sense.

I claim as my invention:

1. In a power and distribution system, the combination comprising, a plurality of energy sources, a separate feeder bus network for each of said plurality of energy sources, separate energy source disconnecting means arranged for connecting such feeder bus networks to their respective energy sources, a paralleling bus network for the system, separate bus tie disconnecting means arranged for connecting their respective energy source feeder bus network of such paralleling bus network, circuit means for connecting a load to the feeder bus network of one of said energy sources, means for obtaining a first signal proportional to said one of said energy sources current that flows on the energy source side of its energy source disconnecting means, means for obtaining a second signal proportional to the vector sum of the current flowing in said circuit means and the current flowing in said paralleling bus network, a sensing circuit responsive to said first and said second signal for effecting a control signal proportion to the difference in magnitude of said first and said second signal, relaying means responsive to said control signal for effecting a deenergization of said one of said energy sources and an actuation of said energy source disconnecting means to the circuit open position when a fault occurs either between said one of said energy sources and said energy source disconnecting means or between said energy source disconnecting means and said means for obtaining said second signal, and other relaying means also responsive to said control signal for effecting, subsequent to the actuation of said energy source disconnecting means, an actuation of the bus tie disconnecting means of said one of said energy sources to the circuit open position only when a fault occurs between said energy source disconnecting means and said means for obtaining said second signal.

2. In a power and distribution system, the combination comprising, a plurality of energy sources, a separate feeder bus network for each of said plurality of energy sources, separate energy source disconnecting means arranged for connecting such feeder bus networks to their respective energy sources, a paralleling bus network for the system, separate bus tie disconnecting means arranged for connecting their respective feeder bus networks to such paralleling bus network, circuit means for connecting a load to the feeder bus network of one of said energy sources, means for obtaining a first signal proportional to said one of said energy sources current that flows on the energy source side of its energy source disconnecting means, means for obtaining a second signal proportional to the vector sum of the current flowing in said circuit means and the current flowing in said paralleling bus network, a sensing circuit responsive to said first and said second signal for effecting a control signal proportional to the difference in magnitude of said first and said second signal, relaying means responsive to said control signal for effecting a deenergization of said one of said energy sources and an actuation of said energy source disconnecting means to the circuit open position when a fault occurs either between said one of said energy sources and said energy source disconnecting means or between said energy source disconnecting means and said means for obtaining said second signal, a relaying circuit connected to effect an actuation of the bus tie disconnecting means of said one of said energy sources, and control means also responsive to said control signal for rendering said relaying circuit responsive to said control signal a period of time after said energy source disconnecting means is actuated to the circuit open position so as to effect an actuation of the bus tie disconnecting means of said one of said energy sources to the circuit open position only when a fault occurs between said energy source disconnecting means and said means for obtaining said second signal.

3. In a multiple-generator power generating and distribution system, the combination comprising, a plurality of generators, a separate feeder bus network for each of said plurality of generators, separate generator breakers arranged for connecting such feeder bus networks to their respective generators, a paralleling bus network for the system, separate generator bus tie breakers arranged for connecting their respective generator feeder bus networks to such paralleling bus network, circuit means for connecting a load to the feeder bus network of one of said generators, a pair of differential current transformers each of the current transformers having a secondary winding, the secondary winding of one of the current transformers of said pair being disposed to effect at its output a first signal proportional to one phase of said one of said generator's armature current that flows on the generator side of its generator breaker and the secondary winding of the other current transformer of said pair being disposed to effect at its output a second signal proportional to the vector sum of the current flowing in the same phase of said paralleling bus network and the current flowing in one phase of said circuit means, a sensing circuit responsive to said first and said second signal for effecting a control signal proportional to the difference in magnitude of said first and said second signal, relaying means responsive to said control signal for effecting a deenergization of said one of said generators and an actuation of said generator breaker to the circuit open position when a fault occurs either in the same phase between said one of said generators and said generator breaker or between said generator breaker and said secondary winding of said other current transformer, and other relaying means also responsive to said control signal for effecting, subsequent to the actuation of said generator breaker, an actuation of the generator bus tie breaker of said one of said generators to the circuit open position when a fault occurs in the same phase between said generator breaker and said secondary winding of said other current transformer.

4. In a multiple-generator power generating and distribution system, the combination comprising, a plurality of generators, a separate feeder bus network for each of said plurality of generators, separate generator breakers arranged for connecting such feeder bus networks to their respective generators, a paralleling bus network for the system, separate generator bus tie breakers arranged for connecting their respective generator feeder bus networks to such paralleling bus network, circuit means for connecting a load to the feeder bus network of one of said generators, current transformer means comprising two sections, one of said two sections being disposed to effect at its output a first signal proportional to said one of said generator's armature current that flows on the generator side of its generator breaker and the other of said two sections being disposed to effect at its output a second signal proportional to the vector sum of the current flowing in said paralleling bus network and the current flowing in said circuit means, a sensing circuit responsive to said first and said second signal for effecting a control signal proportional to the difference in magnitude of said first and said second signal, relaying means responsive to said control signal for effecting a deenergization of said one of said generators and an actuation of said generator breaker to the circuit open position when a fault occurs either between said one of said generators and said generator breaker or between said generator breaker and said other of said two sections, a relaying circuit connected to effect an actuation of the generator bus tie breaker of said one of said generators, and control means also responsive to said control signal for rendering said relaying circuit responsive to said control signal a period of time after said generator breaker is actuated to the circuit open position so as to effect an actuation of the generator bus tie breaker of said one of said generators to the circuit open position only when a fault occurs between said generator breaker and said other of said two sections of the current transformer means.

5. In a multiple-generator power generating and distribution system, the combination comprising, a plurality of generators, a separate feeder bus network for each of said plurality of generators, separate generator breakers arranged for connecting such feeder bus networks to their respective generators, a paralleling bus network for the system, separate generator bus tie breakers arranged for connecting their respective generator feeder bus networks to such paralleling bus network, circuit means for connecting a load of the feeder bus network of one of said generators, current transformer means comprising two sections one of said two sections being disposed to effect at its output a first signal proportional to said one of said generator's armature current that flows on the generator side of its generator breaker and the other of said two sections being disposed to effect at its output a second signal proportional to the vector sum of the current flowing in said paralleling bus network and the current flowing in said circuit means, a sensing circuit responsive to said first and said second signal for effecting a control signal proportional to the difference in magnitude of said first and said second signal, relaying means responsive to said control signal for effecting a deenergization of said one of said generators and an actuation of said generator breaker to the circuit open position when a fault occurs either between said one of said generators and said generator breaker or between said generator breaker and said other of said two sections, a relaying circuit connected to effect an actuation of the generator tie breaker of said one of said generators, and timing means also responsive to said control signal for rendering said relaying circuit responsive to said control signal a predetermined period of time after said generator breaker is actuated to the circuit open position so as to effect an actuation of the generator tie breaker of said one of said generators to the circuit open position only when a fault occurs between said generator breaker and said other of said two sections of the current transformer means.

6. In a three-phase multiple-alternator power generating and distribution system, the combination comprising, a plurality of three-phase alternators, a separate three-phase feeder bus network for each of said alternators, separate alternator breakers arranged for connecting such three-phase feeder bus networks to their respective alternators, a three-phase paralleling bus network for the system, separate alternator bus tie breakers arranged for connecting their respective alternator feeder bus networks to such three-phase paralleling bus network, three-phase circuit means for connecting a load to the feeder bus network of one of said alternators, three pairs of differential current transformers one for each phase of the three-phase system, three of the current transformers of said three pairs being disposed to effect at their output a first signal proportional to said one of said alternator's armature current that flows on the alternator side of its alternator breaker and the other three current transformers being disposed to effect at their output a second signal proportional to the vector sum of the current flowing in said three-phase paralleling bus network and the current flowing in said three-phase circuit means, a sensing circuit responsive to said first and said second signal for effecting a control signal proportional to the difference in magnitude of said first and said second signal, relaying means responsive to said control signal for effecting a deenergization of said one of said alternators and an actuation of said alternator breaker to the circuit open position when a fault occurs either between said one of said alternators and said alternator breaker or between said alternator breaker and said other three current transformers, a relaying circuit connected to effect an actuation of the alternator tie breaker of said one of said alternators, and a time delay relay also responsive to said control signal for rendering said relaying circuit responsive to said control signal a predetermined period of time after said alternator breaker is actuated to the circuit open position so as to effect an actuation of the alternator bus tie breaker of said one of said alternators to the circuit open position only when a fault occurs between said alternator breaker and said other three current transformers.

7. In a multiple-generator power generating and distribution system, the combination comprising, a plurality of generators each having a field winding, a separate feeder bus network for each of said plurality of generators, separate generator breakers arranged for connecting such feeder bus networks, to their respective generators, a paralleling bus network for the system, separate generator bus tie breakers arranged for connecting their respective generator feeder bus networks to such paralleling bus network, circuit means for connecting a load to the feeder bus network of one of said generators, current transformer means comprising two sections, one of said two sections being disposed to effect a first signal proportional to said one of said generator's armature current that flows on the generator side of its generator breaker and the other of said two sections being disposed to effect at its output a second signal proportional to the vector sum of the current flowing in said paralleling bus network and the current flowing in said circuit means, a sensing circuit responsive to said first and said second signal for effecting a control signal proportional to the difference in magnitude of said first and said second signal, relaying means responsive to said control signal for effecting a deenergizing of the field winding of said one of said generators and an actuation of said generator breaker to the circuit open position when a fault occurs either between said one of said generators and said generator breaker or between said generator breaker and said other of said two sections, a relaying circuit connected to effect an actuation of the generator tie breaker of said one of said generators, means for providing a current discharge path for the field winding of said one of said generators once the field winding of said one of said generators has been deenergized, and other relaying means responsive to the current flow in said current discharge path for rendering said relaying circuit responsive to said control signal a period of time after said generator breaker is actuated to the circuit open position so as to effect an actuation of the generator bus tie breaker of said one of said generators to the circuit open position only when a fault occurs between said generator breaker and said other of said two sections of the current transformer means.

References Cited in the file of this patent
UNITED STATES PATENTS 2,885,569    Schuh ------------------ May 5, 1959